(12) United States Patent
Perlman et al.

(10) Patent No.: US 6,614,890 B2
(45) Date of Patent: *Sep. 2, 2003

(54) DISCLOSING THE RECEIPT OF NEW ELECTRONIC MESSAGE

(75) Inventors: Stephen G. Perlman, Mountain View, CA (US); Phillip Y. Goldman, Los Altos, CA (US)

(73) Assignee: WebTV Networks, Inc., Mountain View, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/107,358

(22) Filed: Jun. 30, 1998

(65) Prior Publication Data

US 2002/0048354 A1 Apr. 25, 2002

Related U.S. Application Data

(62) Division of application No. 08/660,087, filed on Jun. 3, 1996.

(51) Int. Cl.[7] .............................................. H04M 11/00
(52) U.S. Cl. .................................................. 379/93.24
(58) Field of Search .......................... 379/93.24, 88.12, 379/88.11, 88.13, 215, 90.01, 110.01, 93.01, 93.17, 93.23, 93.25; 709/206

(56) References Cited

U.S. PATENT DOCUMENTS

| | | | |
|---|---|---|---|
| 4,852,151 A | 7/1989 | Dittakavi et al. | 379/97 |
| 4,922,523 A | 5/1990 | Hashimoto | 379/96 |
| 4,975,944 A | 12/1990 | Cho | 379/209 |
| 4,995,074 A | 2/1991 | Goldman et al. | 379/97 |
| 5,005,011 A | 4/1991 | Perlman et al. | 340/728 |
| 5,095,494 A | 3/1992 | Takahashi et al. | 375/10 |

(List continued on next page.)

OTHER PUBLICATIONS

Rosoff, Matt; C|NET, Gateway Destination PC, Remote–Controlled Computing on a 31–inch Screen; Feb. 19, 1996.

Seidman, Robert; C|NET, shareware.com"What Larry and Lou Know (That you Don't)"; Jan. 29, 1996.

Stellin, Susan; C|NET, susans@cnet.com, "The $500 Web box: less is more?".

Vincent, T.; Innovations in Education and Training International, "Digital Audio and Disabled Learners,"; vol. 33, No. 1, p. 66–7; Feb. 1996.

*Primary Examiner*—Stella Woo
(74) *Attorney, Agent, or Firm*—Workman, Nydegger & Seeley

(57) ABSTRACT

A client is coupled to a modem pool and a server by a communication link in a wide area network. The client allows a user to browse the World Wide Web in response to user inputs entered entirely from a remote control device using a television set as a display device. The communication link to the client is shared by a telephone circuit at the client end of the link. A disruption in communication with the server may occur due to a Call Waiting signal caused by an incoming telephone call. The incoming call includes Caller ID information. In response to such a disruption, communication with the server is terminated. After pausing for a predetermined period of time, the client automatically re-establishes communication with the server if the line is clear. Upon reconnecting to the server, the client accesses a "White Pages" telephone directory Web site on a remote server. Using the number provided in the Caller ID information, the client looks up the name of the caller from the directory and stores the number and the corresponding name. Each time an incoming call is subsequently received from that number, the client displays the name of the calling party to the user as the call is received.

6 Claims, 9 Drawing Sheets

U.S. PATENT DOCUMENTS

| | | | | |
|---|---|---|---|---|
| 5,204,895 | A | 4/1993 | Yoshiura | 379/100 |
| 5,241,587 | A | 8/1993 | Horton et al. | 379/92 |
| 5,263,084 | A | 11/1993 | Chaput et al. | 379/215 |
| 5,276,731 | A | 1/1994 | Arbel et al. | 379/88 |
| 5,287,401 | A | 2/1994 | Lin | 379/98 |
| 5,289,536 | A | 2/1994 | Hokari | 379/221 |
| 5,299,307 | A | 3/1994 | Young | 395/161 |
| 5,325,423 | A | 6/1994 | Lewis | 379/90 |
| 5,341,293 | A | 8/1994 | Vertelney et al. | 364/419.17 |
| 5,349,638 | A | 9/1994 | Pitroda et al. | 379/142 |
| 5,369,688 | A | 11/1994 | Tsukamoto et al. | 379/100 |
| 5,410,541 | A | 4/1995 | Hotto | 370/76 |
| 5,414,773 | A * | 5/1995 | Handelman | 379/93.24 |
| 5,425,085 | A | 6/1995 | Weinberger et al. | 379/112 |
| 5,425,092 | A | 6/1995 | Quirk | 379/215 |
| 5,461,667 | A | 10/1995 | Remillard | 379/96 |
| 5,469,540 | A | 11/1995 | Powers, III et al. | 395/158 |
| 5,488,411 | A | 1/1996 | Lewis | 348/8 |
| 5,490,208 | A | 2/1996 | Remillard | 379/96 |
| 5,513,251 | A | 4/1996 | Rochkind et al. | 379/93 |
| 5,519,767 | A | 5/1996 | O'Horo et al. | 379/97 |
| 5,538,255 | A | 7/1996 | Barker | 463/41 |
| 5,561,709 | A | 10/1996 | Remillard | 379/96 |
| 5,564,001 | A | 10/1996 | Lewis | 395/154 |
| 5,612,730 | A | 3/1997 | Lewis | 348/8 |
| 5,651,060 | A | 7/1997 | Cohn et al. | 379/215 |
| 5,654,886 | A | 8/1997 | Zereski, Jr. et al. | 364/420 |
| 5,757,891 | A * | 5/1998 | Wang | 379/93.24 |
| 5,825,867 | A * | 10/1998 | Epler et al. | 379/215 |
| 5,956,486 | A * | 9/1999 | Hickman et al. | 379/93.24 |
| 6,052,442 | A * | 4/2000 | Cooper et al. | 379/93.24 |

* cited by examiner

DISCLOSING THE RECEIPT OF NEW ELECTRONIC MESSAGE

RELATED APPLICATIONS

This is a divisional of copending U.S. patent application Ser. No. 08/660,087, filed Jun. 3, 1996, which is hereby incorporated by reference.

BACKGROUND OF THE INVENTION

1. Field of the Invention

The present invention pertains to the field of client-server computer networking. More particularly, the present invention relates to a method and apparatus for providing communications between a client and a server in a computer network.

2. Prior State of the Art

The number of homes and businesses using personal computers has increased substantially in recent years. Along with this increase has come an explosion in the use of the Internet, and particularly in the use of the World-Wide Web ("the Web"). The Web is a collection of formatted hypertext pages located on numerous computers around the world that are logically connected by the Internet. Advances in network technology, particularly software for providing user interfaces to the Web ("Web browsers"), have made the Web accessible to a large segment of the population. However, despite the growth in the development and use of the Web, many people are still unable to take advantage of this important resource.

Access to the Web has thus far been limited mostly to people who have access to a personal computer. However, many people cannot afford the cost of even a relatively inexpensive personal computer, while others are either unable or unwilling to learn the basic computer skills that are required to access the Web. Furthermore, Web browsers in the prior art generally do not provide the degree of user-friendliness desired by some people, and many computer novices do not have the patience to learn how to use the software. Therefore, it would be desirable to provide an inexpensive means by which a person can access the Web without the use of a personal computer. In particular, it would be desirable for a person to be able to access the Web pages using an ordinary television set and a remote control, so that the person feels more as if he or she is simply changing television channels, rather than utilizing a complex computer network.

Computer systems often communicate data with each other over large distances using standard telephone lines (also known as "POTS," for Plain Old Telephone Service). Often a computer does not have a telephone line dedicated solely for its own use, however. Instead, a computer often uses a telephone line that is also used for standard telephone voice communication. Such dual use of the telephone line can cause problems for computers. For example, many conventional telephone services provide a feature known as "Call Waiting," which notifies a person involved in a telephone conversation when there is another incoming call on that line. The person receiving the new call generally is notified by an audible tone caused by a Call Waiting signal. In response, the person can either switch to the other call without disconnecting the call already in progress (a technique sometimes called "flashing") or simply ignore the new call. However, a Call Waiting signal can severely disrupt data communications if it is received while a computer is using the line.

Although some communications software provides the ability to disable the Call Waiting signal, doing so has the disadvantage that the computer's user generally has no way of knowing when someone is trying to reach him by telephone. Hence, it would be desirable to avoid severe disruptions without disabling the Call Waiting capability, particularly when browsing the Web.

Prior art systems that have accommodated Call Waiting during modem communications have done so only in client-to-client communications, and have only handled the case of both clients and modems being programmed to handle a Call Waiting interruption. Examples of such systems are a voice-over-data modem designed by Phylon, Inc., of Fremont, Calif., and a data-only modem designed by Catapult Entertainment of Cupertino, Calif. Both products are designed for video game play over a modem, and both handle Call Waiting interruptions by detecting the interruption, signaling the other client of the condition, and then both clients terminating the phone connection to allow the incoming call to be answered. When the call is completed, one modem dials the other to resume game play.

These two systems do not handle a more difficult condition: that of a client modem that is designed to handle a Call Waiting interruption which is dialed into a server modem that is not. For example, such a client modem might dial into a modem pool, such as that providing Internet access, which was designed using conventional modems. Since such conventional modems were designed with the assumption that dial-up would be through a phone connection that was not to be periodically interrupted by Call Waiting, they do not support the signaling and reconnect protocols that allowed the prior art video game modems to resume a connection smoothly after a Call Waiting interruption.

Unfortunately, the vast majority of server modems in use in the world today are conventional modems designed with the assumption that the dial-up is through a connection not periodically interrupted by Call Waiting. Thus, as a practical matter, the prior art video game modems, which rely on the system on the other side of the phone connection as including a Call Waiting aware modem and client, do not handle a client-server modem connection that is interrupted by Call Waiting.

In addition to the Call Waiting feature, some telephone services provide a feature known as Caller ID. Caller ID provides a person who receives a telephone call and who has the proper equipment with the phone number from which an incoming call originates. This service can be quite useful when the person receiving the call recognizes the number. However, people sometimes receive telephone calls originating from telephone numbers with which they are not familiar. Therefore, it would be desirable to provide a Caller ID subscriber with more detailed information regarding the source of an incoming call. It would further be desirable to provide such information to a subscriber who is using the telephone line to browse the Web at the time the call is received.

SUMMARY AND OBJECTS OF THE INVENTION

In a client system communicating with a server system over a communication link, a method is provided of responding to a disruption in communication with the server system. The communication link includes a telephone line. In response to the disruption, the client terminates communication with the server. The client then established an on-hook condition on the telephone line and waits for a ring signal.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION OF THE PREFERRED EMBODIMENTS

A method and apparatus are described for managing communications between a client and a server in a computer network. In the following description, for purposes of explanation, numerous specific details are set forth in order to provide a thorough understanding of the present invention. It will be evident, however, to one skilled in the art that the present invention may be practiced without these specific details. In other instances, well-known structures and devices are shown in block diagram form in order to avoid unnecessarily obscuring the present invention.

The present invention includes various steps, which will be described below. The steps can be embodied in machine-executable instructions, which can be used to cause a general-purpose or special-purpose processor programmed with the instructions to perform the steps. Alternatively, the steps of the present invention might be performed by specific hardware components that contain hardwired logic for performing the steps, or by any combination of programmed computer components and custom hardware components.

The present invention is included in a system, known as WebTV™, for providing a user with access to the Internet. A user of a WebTV™ client generally accesses a WebTV™ server via a direct-dial telephone (POTS, for "plain old telephone service"), ISDN (Integrated Services Digital Network), or other similar connection, in order to browse the Web, send and receive electronic mail (e-mail), and use various other WebTV™ network services. In the preferred embodiment, the WebTV™ network services are provided by WebTV™ servers using software residing within the WebTV™ servers in conjunction with software residing within a WebTV™ client.

Figure 1:
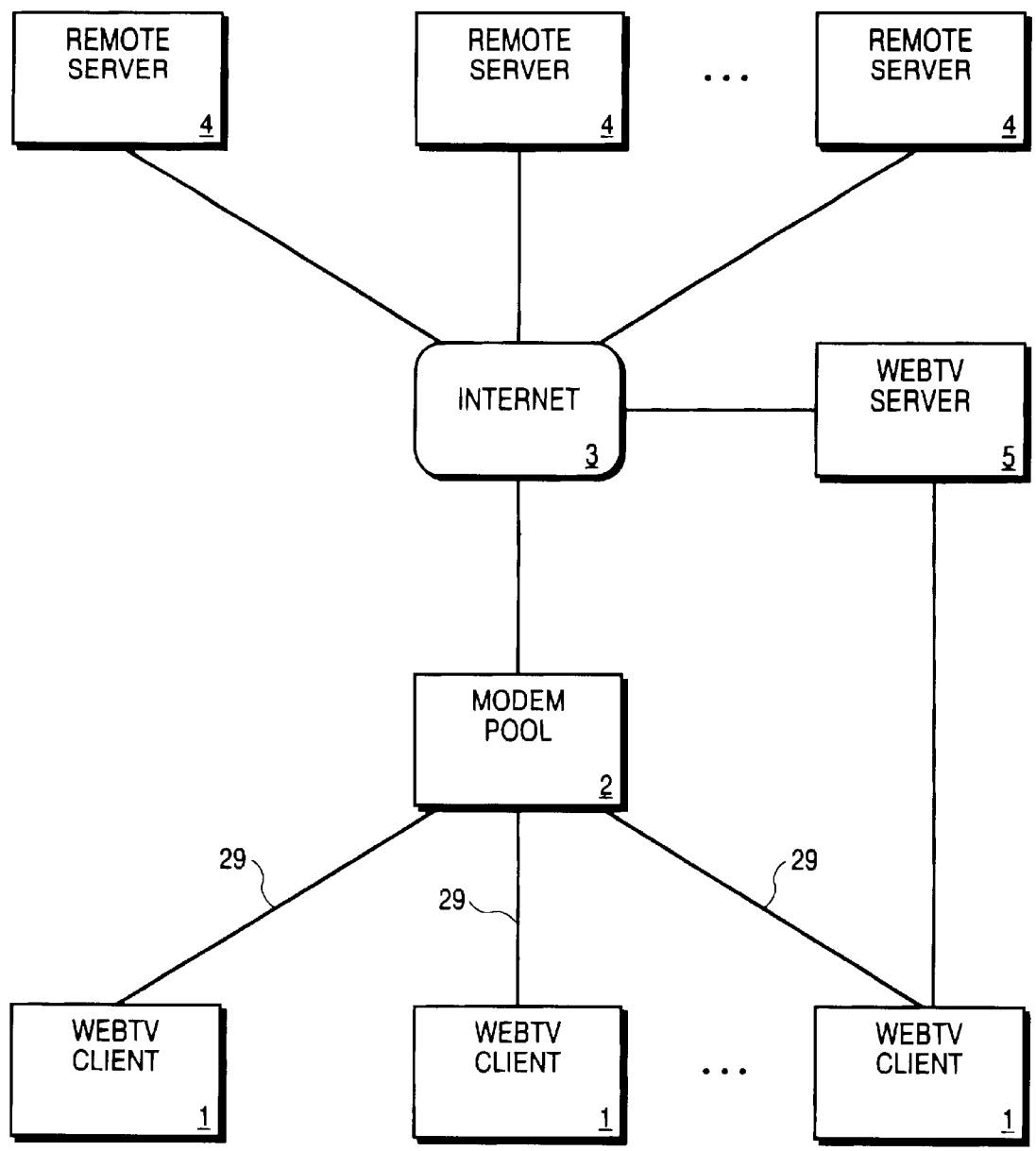
FIG. 1 illustrates several client systems connected to a server system in a network.

FIG. 1 illustrates a basic configuration of the WebTV™ network according to one embodiment. A number of WebTV™ clients 1 are coupled to a modem pool 2 via direct-dial, bi-directional data connections 29, which may be telephone (POTS, i.e.. "plain old telephone service"), ISDN (Integrated Services Digital Network), or any other similar type of connection. The modem pool 2 is coupled typically through a router, such as that conventionally known in the art, to a number of remote servers 4 via a conventional network infrastructure 3, such as the Internet. The WebTV™ system also includes a WebTV™ server 5, which specifically supports the WebTV™ clients 1. The WebTV™ clients 1 each have a connection to the WebTV™ server 5 either directly or through the modem pool 2 and the Internet 3. Note that the modem pool 2 is a conventional modem pool, such as those found today throughout the world providing access to the Internet and private networks.

Note that in this description, in order to facilitate explanation the WebTV™ server 5 is generally discussed as if it were a single device, and functions provided by the WebTV™ services are generally discussed as being performed by such single device. However, the WebTV™ server 5 may actually comprise multiple physical and logical devices connected in a distributed architecture, and the various functions discussed below which are provided by the WebTV™ services may actually be distributed among multiple WebTV™ server devices.

Figure 2A:
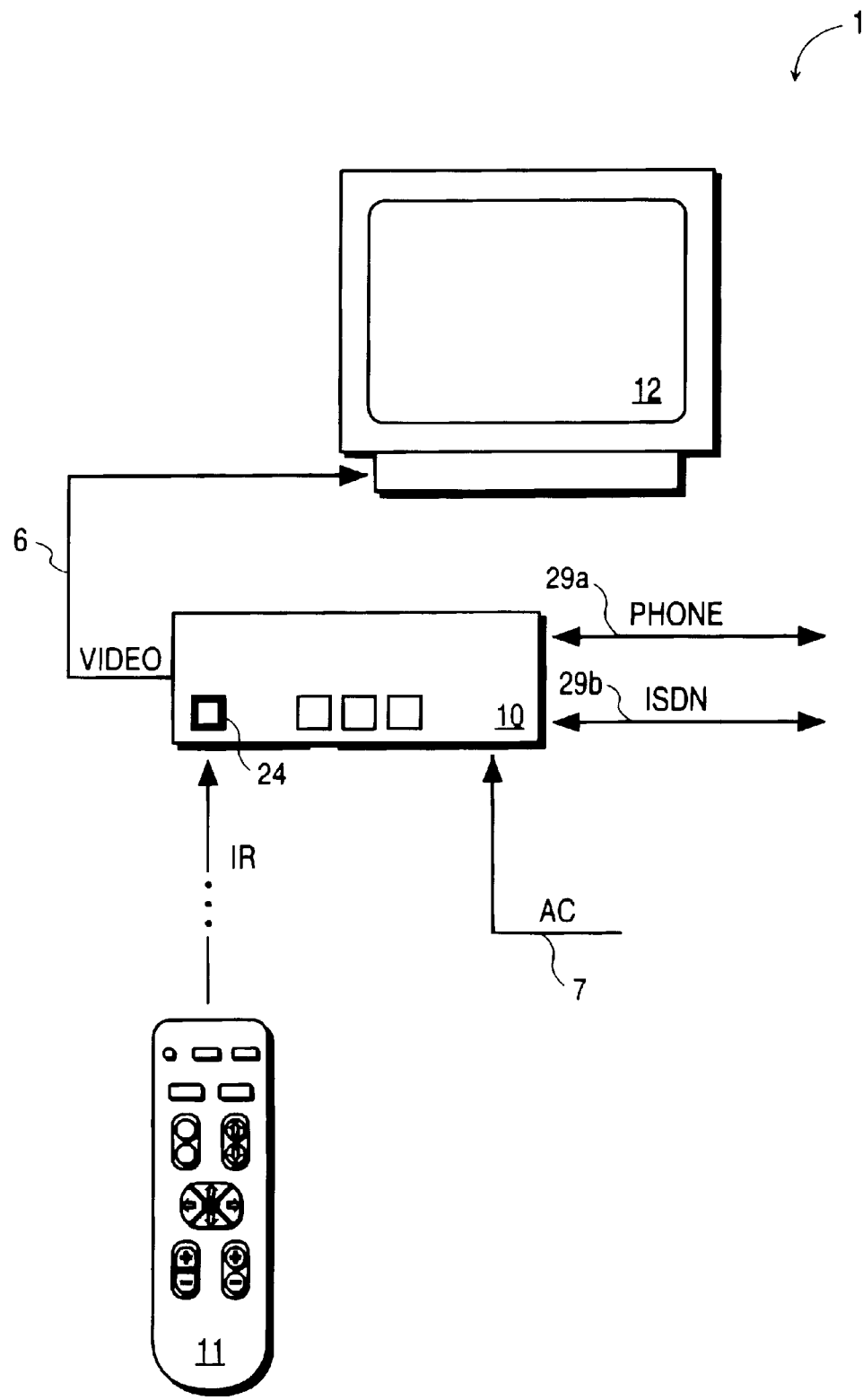
FIG. 2A illustrates a client system for browsing the World-Wide Web.

FIG. 2A illustrates a WebTV™ client 1. The WebTV™ client 1 includes an electronics unit 10 (hereinafter referred to as "the WebTV™ box 10"), an ordinary television set 12, and a remote control 11. In an alternative embodiment of the present invention, the WebTV™ box 10 is built into the television set 12 as an integral unit. The WebTV™ box 10 includes hardware and software for providing the user with a graphical user interface, by which the user can access the WebTV™ network services, browse the Web, send e-mail, and otherwise access the Internet.

The WebTV™ client 1 uses the television set 12 as a display device. The WebTV™ box 10 is coupled to the television set 12 by a video link 6. The video link 6 is an RF (radio frequency), S-video, composite video, or other equivalent form of video link. The communication link 29 between the WebTV™ box 10 and the server 5 is either a telephone (POTS) connection 29a or an ISDN connection 29b. The WebTV™ box 10 receives AC (alternating current) power through an AC power line 7.

Remote control 11 is operated by the user in order to control the WebTV™ client 1 in browsing the Web, sending e-mail, and performing other Internet-related functions. The WebTV™ box 10 receives commands from remote control 11 via an infrared (IR) communication link. In alternative embodiments, the link between the remote control 11 and the WebTV™ box 10 may be RF or any equivalent mode of transmission.

Figure 2B:
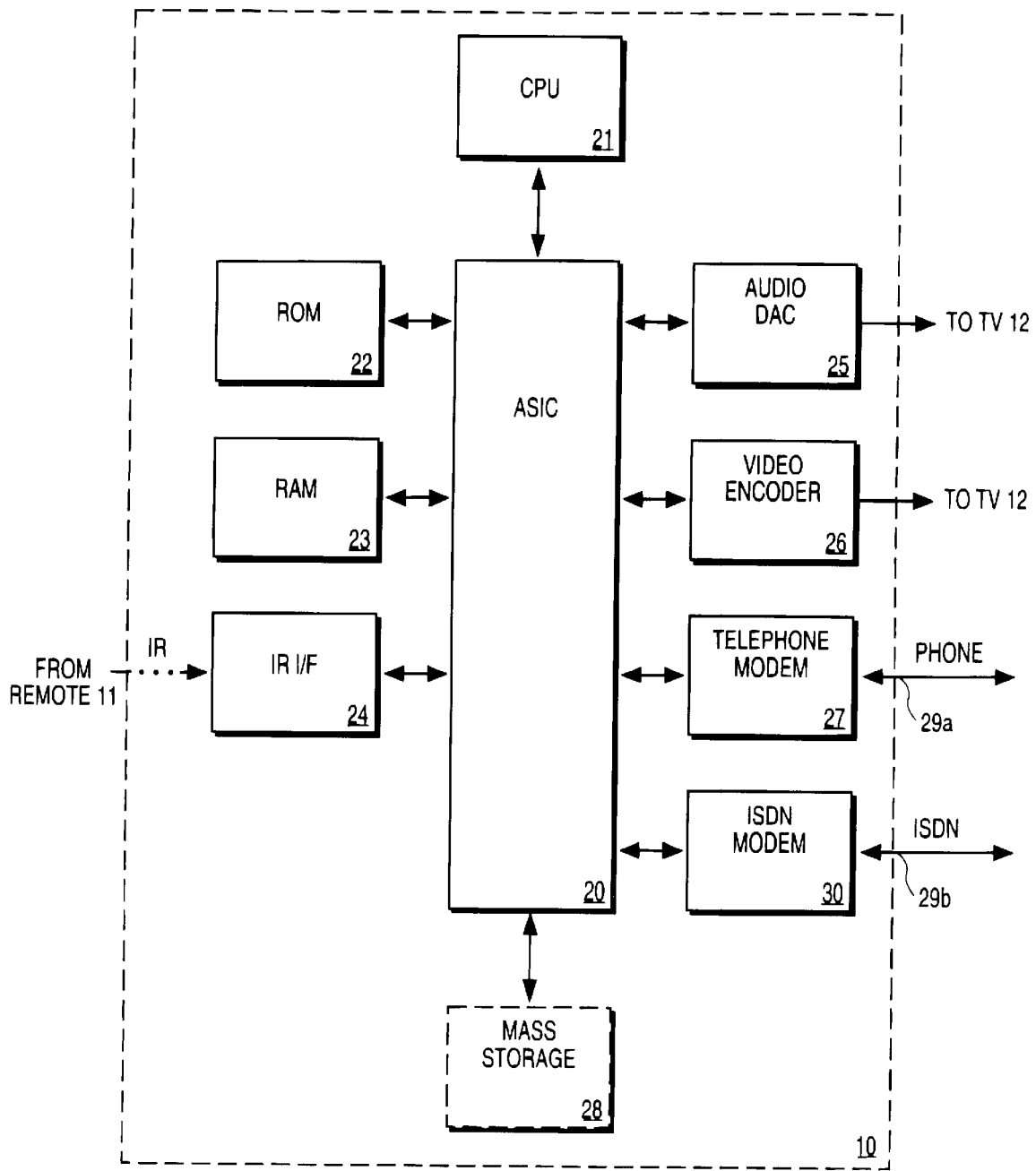
FIG. 2B is a block diagram of an electronics unit of the client system.

FIG. 2B is a block diagram of the internal features of the WebTV™ box 10. Operation of the WebTV™ client 1 is controlled by a central processing unit (CPU) 21 which is coupled to an Application-Specific Integrated Circuit (ASIC) 20. The CPU 21 executes software designed to implement features of the present invention. ASIC 20 contains circuitry which may be used to implement certain features provided by the WebTV™ client 1. ASIC 20 is coupled to an audio digital-to-analog converter 25 which provides audio output to television 12. In addition, ASIC 20 is coupled to a video encoder 26 which provides video output to television set 12. An IR interface 24 detects IR signals transmitted by remote control 11 and, in response, provides corresponding electrical signals to ASIC 20. A standard telephone modem 27 and an ISDN modem 30 are coupled to ASIC 20 to provide connections 29a and 29b, respectively, to the modem pool 2 and, via the Internet 3, to the remote servers 4. Note that the WebTV™ box 10 also may include a cable television modem (not shown).

Also coupled to ASIC 20 is Read-Only Memory (ROM) 22, which provides storage of program code for implementing the application software to be executed by the WebTV™ box 10. Note that ROM 22 may be a programmable ROM (PROM) or any form of erasable PROM (EPROM) or Flash memory. Also coupled to ASIC 20 is Random Access Memory (RAM) 23. A mass storage device 28 may optionally be provided and coupled to ASIC 20. The mass storage device 28 may be used to input software or data to the client or to download software of data received over network connection 29. The mass storage device 28 includes any suitable medium for storing machine-executable instructions, such as magnetic disks, optical disks, and the like.

Figure 3:
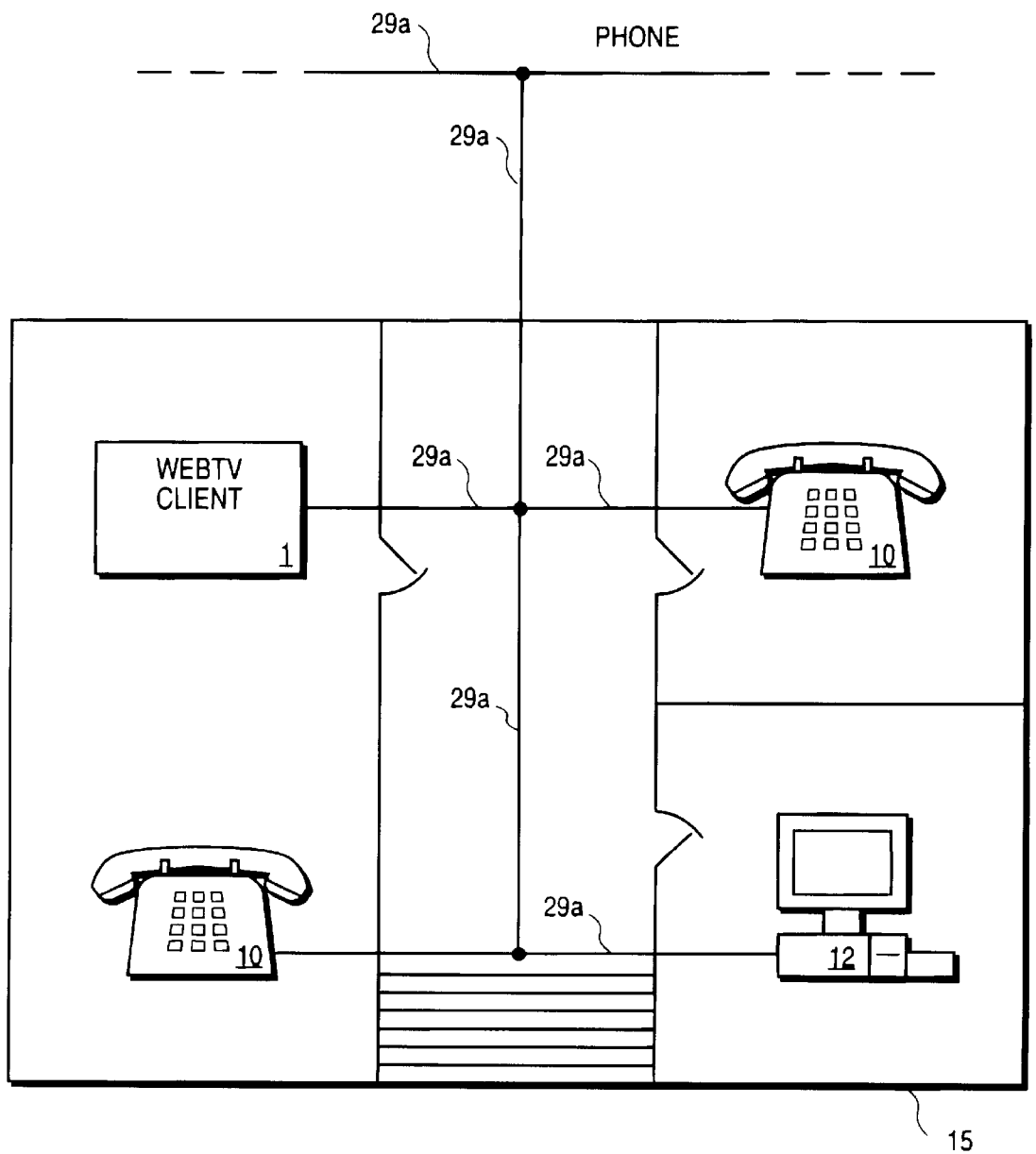
FIG. 3 illustrates telephones, a client system, and a standard personal computer sharing one telephone line.
Figure 4:
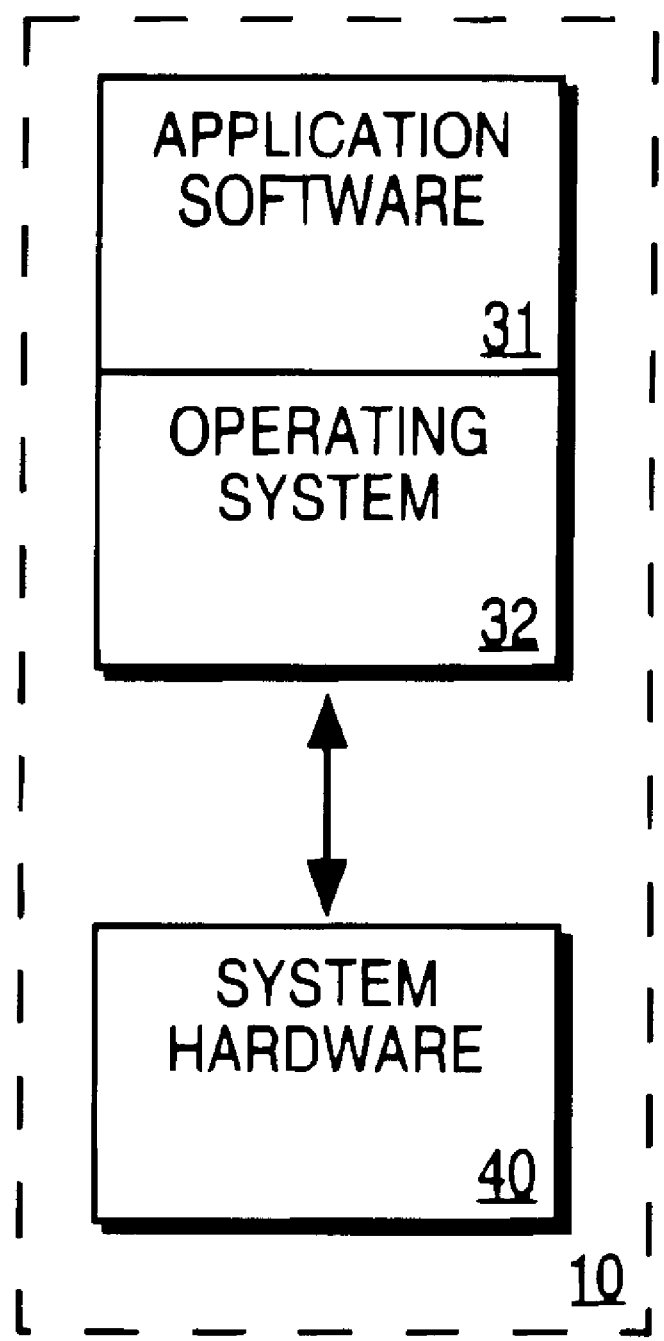
FIG. 4 illustrates the functional relationship between hardware and software in the client system.

FIG. 3 illustrates a WebTV™ client 1 implemented in a home 15 according to one exemplary embodiment. Within the home 15, the WebTV™ client 1 shares the telephone line 29a with two conventional telephone sets ("extensions") 10 and a modem of a personal computer 12. Accordingly, the telephone line 29a is used for both data communication (by WebTV™ client 1 and the personal computer 12) and voice communication at different times. The telephone line 29a corresponds to a single telephone number within the home 15.

As mentioned above, the WebTV™ box 10 includes application software including a Web browser. Referring now to FIG. 2A, the above-mentioned application software 31 operates in conjunction with operating system (OS) software 32. The OS software 32 includes various device drivers and otherwise provides an interface between the application software 31 and the system hardware components 40 (i.e., the elements illustrated in FIG. 1C).

In the preferred embodiment, the application software 31 and OS software 32 are generally stored in ROM 22. It will be recognized, however, that either or both of application software 31 and OS software 32 can be stored on any suitable storage medium, including magnetic or optical storage devices.

Assume now that the WebTV™ client 1 is implemented in a configuration as shown in FIG. 3. That is, the WebTV™ client 1 shares a single telephone line 29a with one or more standard telephone extensions in a home 15. Assume further that telephone service provided to the home 15 includes the Call Waiting and Caller ID services. Hence, an incoming telephone call received at the home 15 while the user is browsing the Web using the WebTV™ client 1 will be indicated by reception of a Call Waiting signal. The Call Waiting signal will cause disruptions in data communications on the telephone line. Some prior art client-to-server modems treat a disruption such as a Call Waiting signal as an error condition and either attempt to maintain the data connection or simply lose the connection. Other prior art client-to-server modems simply disable the Call Waiting signal. A disadvantage of both of these approaches is that the user of the Web browser is typically left unaware of the incoming call. The present invention, however, overcomes this disadvantage.

Figure 5:
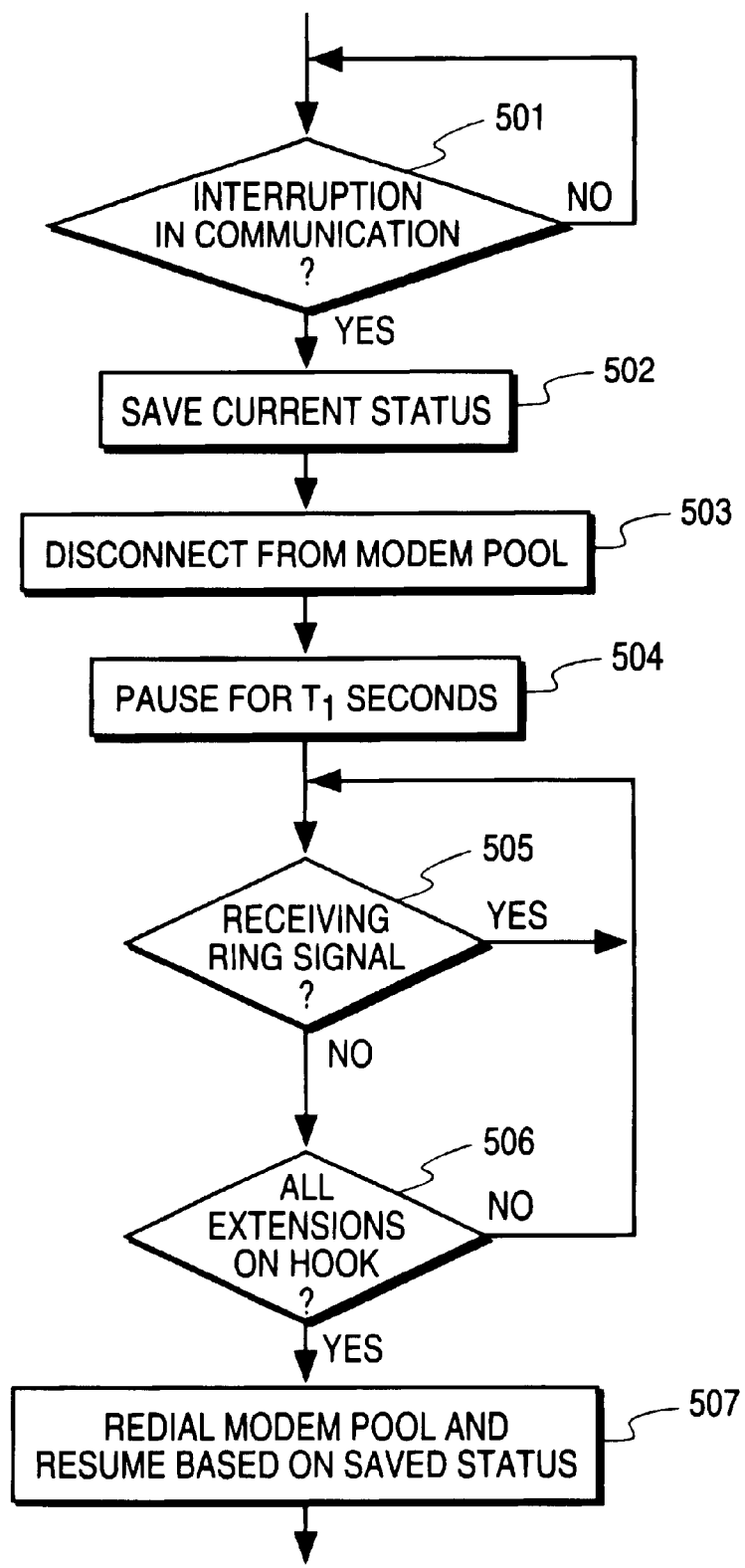
FIG. 5 is a flow diagram illustrating a routine for handling an interruption in communication in the client system.

Any interruption in data communication is essentially treated as a pause condition by the WebTV™ client 1. Specifically, in response to any interruption in data communication, including a Call Waiting signal, the client 1 automatically disconnects from the modem pool 2 and then automatically reconnects to the modem pool 2 at a later time while maintaining the user's browsing state. Referring now to FIG. 5, if an interruption in communication is detected by the WebTV™ client 1 (step 501) while the client 1 is in contact with the WebTV™ server 5 (or any other server), then the client 1 saves information describing the current browsing status to memory (RAM) 23 (step 502). The saved information includes all information that is necessary to exactly identify the Web site at which the user was browsing and to automatically return to that location later without further input from the user. Once the status information is saved, the client 1 automatically disconnects from the modem pool 2 (step 503). The client 1 then waits for a predetermined time interval $T_1$ (ten seconds, for example) (step 504). At the expiration of the time interval $T_1$, the client 1 determines whether an incoming call is still being received by attempting to detect a ring signal on the telephone line 29 (step 505). Detection of a ring signal would indicate that a third party is still attempting to call in, since an on-hook condition after a Call Waiting signal tells the Telephone Company Central Office telephone switch that it is to transmit a ring signal. The client 1 further determines whether all telephone extensions are on the hook (i.e., inactive, or closed) (step 506). This determination is made by sensing the impedance on the telephone line 29. If no ring signal is detected and all extensions are on the hook, then the client 1 automatically redials the modem pool 2 and resumes the previous browsing state based the status information saved earlier (step 507). If, however, either a ring signal is detected or an extension is off the hook (active) (e.g., if another member of the household had picked up an extension phone and had begun to dial), then the client 1 waits until that is not the case before re-establishing the connection to the modem pool 2. Thus, whether the disruption was a Call Waiting interruption or a disruption from another person trying to make a call, the same mechanism gracefully handles the situation.

Figure 6:
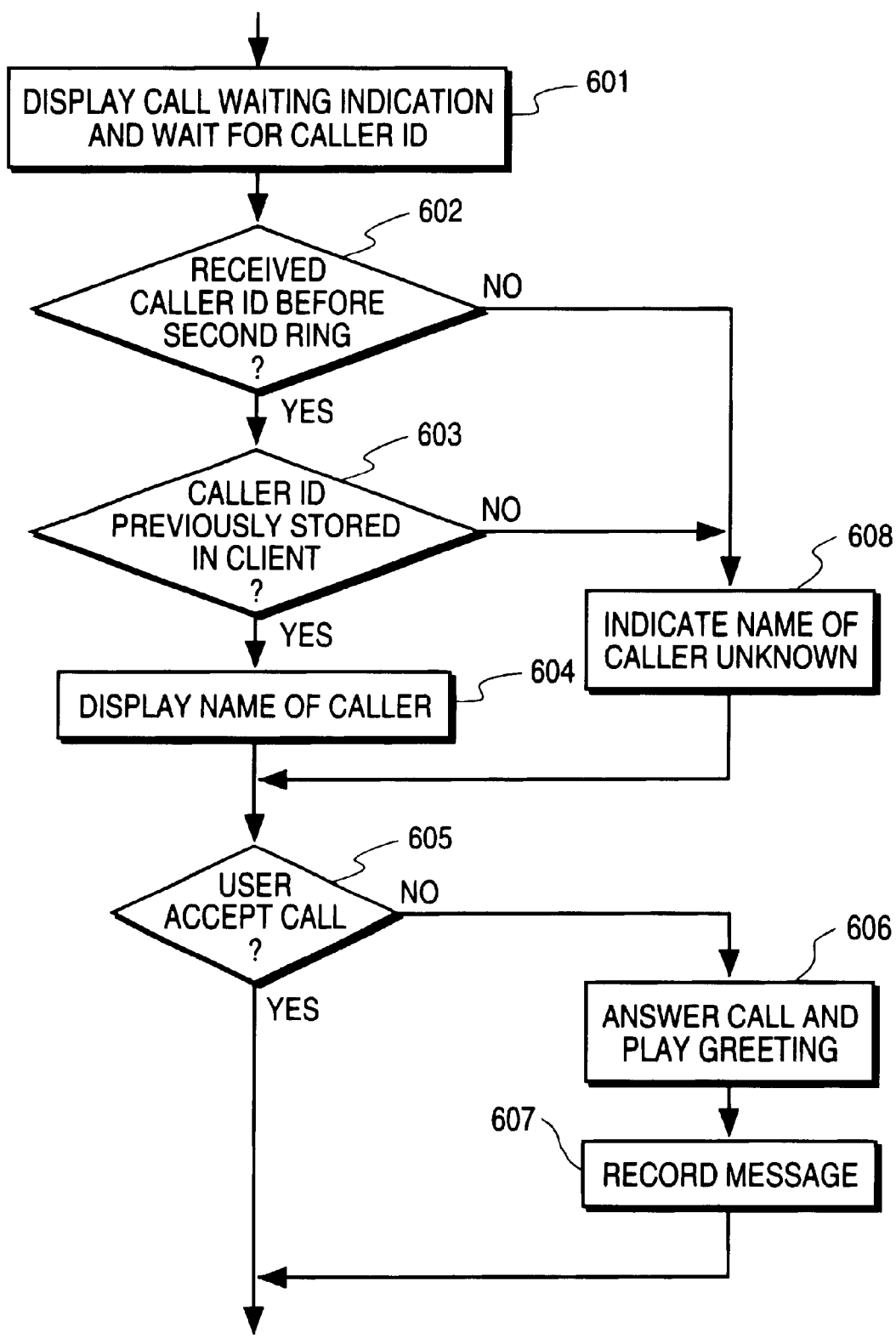
FIG. 6 is a flow diagram illustrating a routine for responding to a call-waiting signal.

As mentioned above, it is assumed that the telephone service provided to the home 15 includes Caller ID service. Note, however, that Caller ID service is not essential to support the Call Waiting capabilities of the present invention. The present invention utilizes the Caller ID information to provide the user with information identifying the source of the incoming call. Referring now to FIG. 6, assume that an incoming telephone call is received while the user is browsing the Web. Accordingly, the client 1 disconnects from the modem pool 2 after saving browsing status information. The client 1 then causes a message to be displayed to the user on the television set 12 indicating that an incoming call is being received (step 601). The client then waits for Caller ID information. This information is typically is received between the first and second ring signal (step 601). If Caller ID information is received before the expiration of a preset time period, such as before the second ring signal (step 602), then the client 1 determines whether the phone number of the incoming call has previously been stored in memory 23 with a corresponding name (step 603). If so, the name corresponding to the source of the incoming call is retrieved from memory 23 and displayed to the user in conjunction with the Call Waiting message (step 604). If no Caller ID information is received or if there is no name corresponding to the incoming phone number stored in memory 23, then a message is displayed to the user indicating that the name of the caller is unknown (step 608). If the user accepts the incoming call by picking up one of the telephone sets 10 within the predetermined number of rings, the routine ends (step 605). However, if the user does not accept the call, client 1 automatically answers the call. Specifically, the client 1 plays a recorded greeting to the caller (step 606) and then digitally records any message the incoming caller chooses to leave (step 607). The message left by the incoming caller is also played to the user of the client 1 in real time as it is recorded, using the speaker of the television set 12 for audio output.

Figure 7:
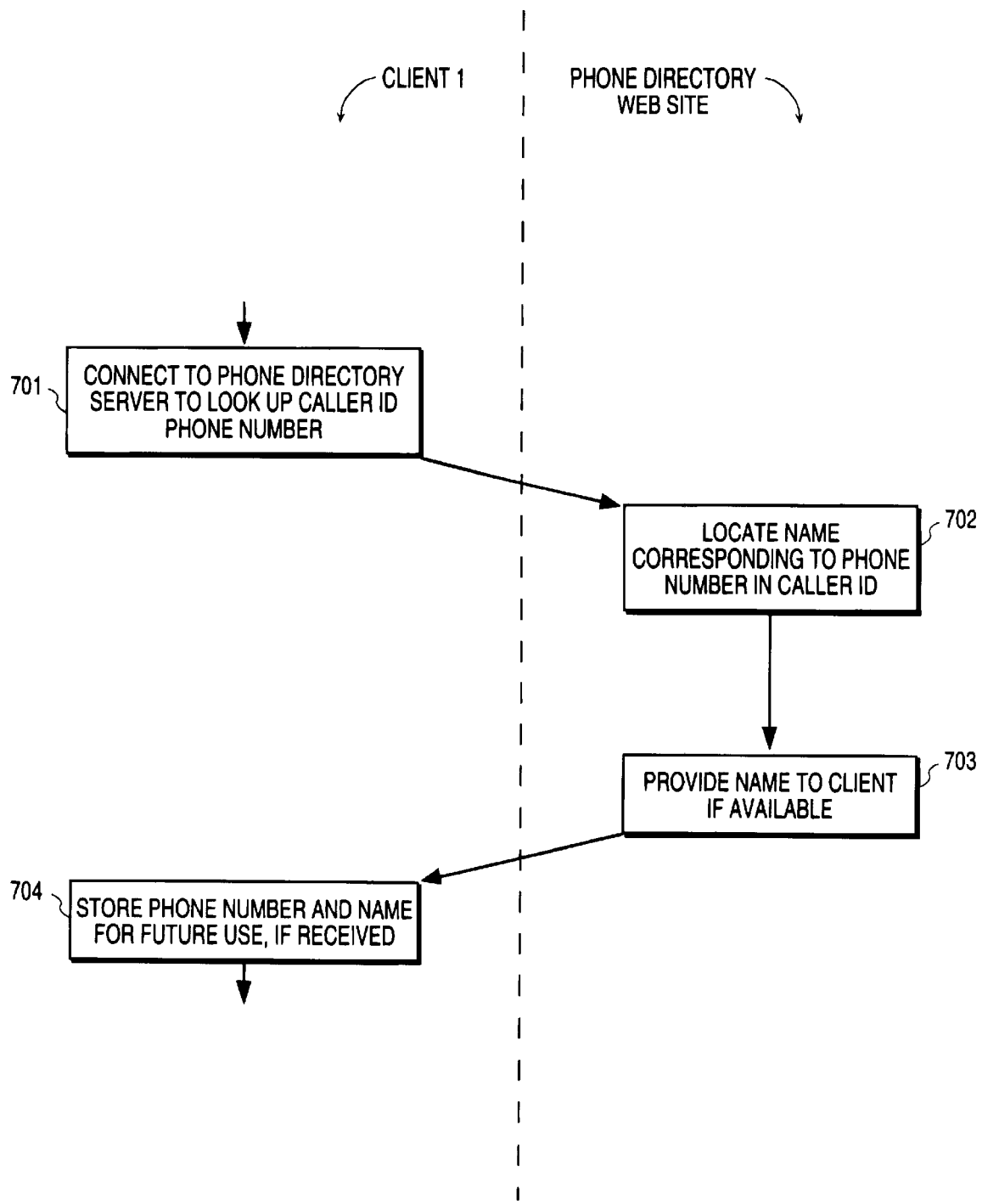
FIG. 7 is a flow diagram illustrating a routine for determining a name associated with a phone number derived from Caller ID information.

Referring now to FIG. 7, the next time the client 1 connects to the Internet, the client 1 automatically sends a request to appropriate "White Pages" database servers for the name of the source of the last telephone call (step 701), assuming Caller ID information was received for that call. The request includes the telephone number provided by the Caller ID service. Such Web sites containing "White Pages" telephone directory information are well-known. The telephone directory Web site allows the accessing party to search based on a given telephone number or name. Accordingly, the client 1 automatically looks up the telephone number from the Caller ID information using the telephone directory Web site (step 702). If the telephone directory Web site locates the telephone number (step 703), then upon receiving the name, the client 1 stores the telephone number and the corresponding name in memory 23 for future use (step 704). Hence, each time in the future an incoming call is received from that telephone number, the name of the calling party is automatically retrieved from memory 23 and displayed to the user (FIG. 6, step 604).

The present invention also includes a selective forwarding feature by which the user of the client 1 is automatically notified via e-mail or telephone when an incoming telephone call is received from a specified source, even if the user is at a geographic location different from that of the client 1. The user initially selects a message forwarding option and inputs an identity of a calling party to the client 1. The identity may be specified in the form of a telephone number or a name. Number buttons on remote control 11 can be used to enter the digits of a telephone number. To enter alphabetical characters of a name, the user can selects soft buttons within an image of a keyboard that is displayed on television set 12. Alternatively, the characters can be entered through the use of a wireless keyboard. The user also selects a forwarding mode as either "e-mail," "telephone," or both and inputs a destination e-mail address and/or telephone number designating the location to which the forwarding message is to be sent.

Figure 8:
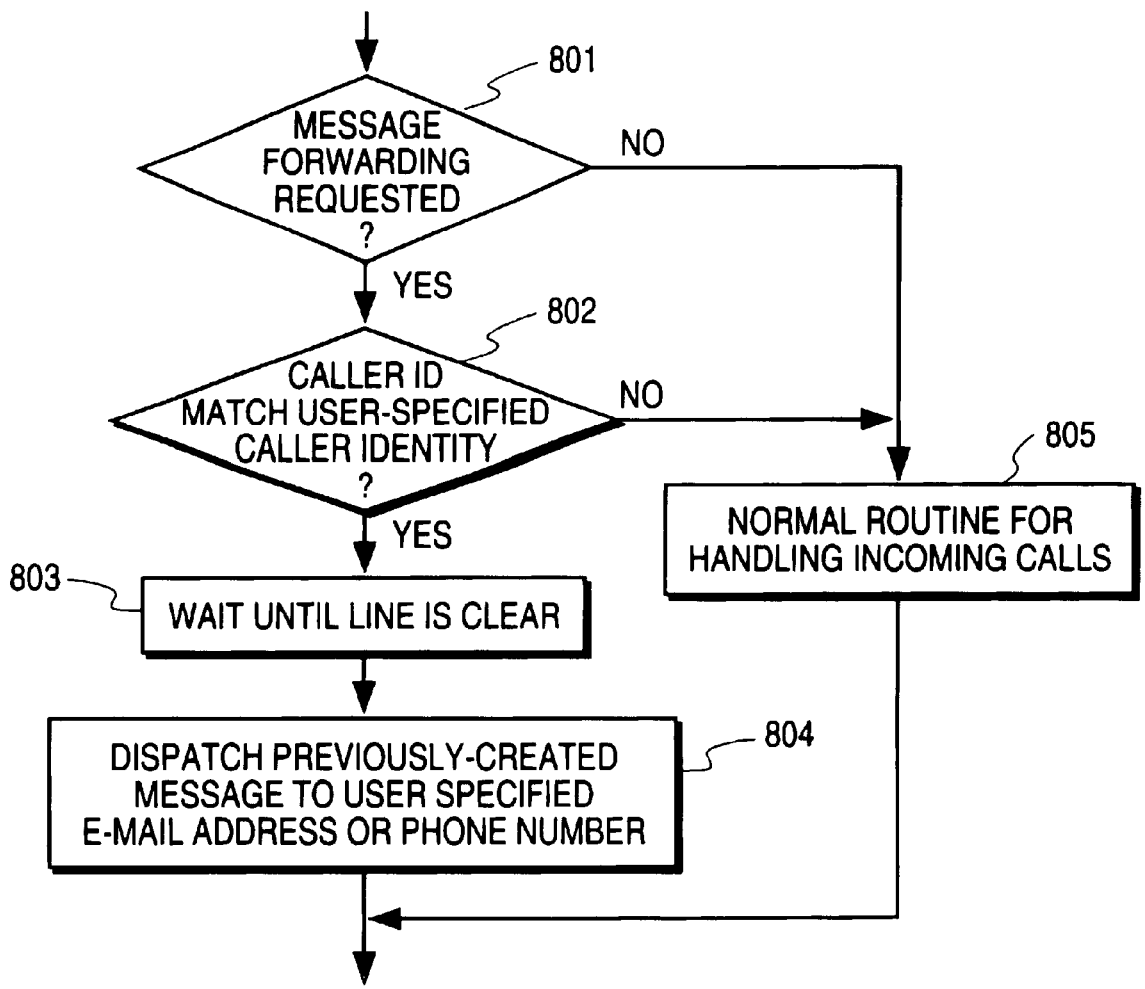
FIG. 8 is a flow diagram illustrating a routine used by a client system for selectively notifying a user of an incoming telephone call.

FIG. 8 illustrates a routine by which the client 1 forward messages to the user at a remote location. When an incoming call is received, then if the user has selected the message forwarding option (step 801), the client 1 determines whether the calling party identity specified by the user matches the Caller ID information (step 802). If the user-specified identity was provided as a name, the client 1 uses the identification procedures described above to determine if there is a match. Specifically, the client 1 determines whether the telephone number in the Caller ID information is stored in memory 23 and, if so, whether there is a corresponding name stored.

If the Caller ID information does not match the user-specified caller identity, the standard routine for handling incoming calls is performed (step 805). If, however, there is a match, then the client 1 waits until the line is clear (i.e., no incoming call is being received and all handsets are on the hook) (step 803). When the line is clear, the client 1 automatically dispatches a message to the location specified by the user. The message may be a default message or a user-created message. If the telephone mode was selected, the client 1 will automatically dial the user-specified destination telephone number and play a pre-recorded message if the call is answered. Hence, using the above technique, the user is notified immediately when a specified party calls, even when the user is located away from the client 1.

The present invention also provides conventional e-mail capabilities. E-mail addressed to a WebTV™ user is stored in the WebTV™ server 5. When e-mail addressed to the user is received by the server 5, the server 5 signals this fact to the client 1 if the client 1 is presently connected to the server 5. Upon receiving this signal, the client 1 provides an indication to the user that the user has e-mail. The indication is provided in the form of a lighted LED (Light-Emitting Diode) built into the housing of WebTV™ box 10, a text message displayed on television set 12, or both. In one embodiment of the present invention, the client 1 automatically dials out and connects to the WebTV™ server 5 at regular intervals or at specified times of the day to determine whether the user has any new e-mail, and both downloads any e-mail into memory (e.g., RAM 23) for fast retrieval and illuminates the LED.

Another feature of the present invention relates to reducing costs associated with ISDN service. As mentioned above, the client 1 has both a standard telephone connection 29a and an ISDN connection 29b with the server 5. It is well known that an ISDN connection permits faster data communication than a standard telephone connection according to the present state of the art. However, ISDN service tends to be more expensive than standard telephone service. Consequently, the present invention provides a means for reducing communications costs associated with accessing the Internet. Specifically, the client 1 keeps track of the time of day and routes communications through the ISDN connection 29b during hours which are not considered "prime time" for ISDN usage. However, the client 1 automatically directs communications through the standard telephone connection 29a during ISDN prime time, when rates are most expensive.

In another aspect of the present invention, the client 1 automatically disconnects from the WebTV™ server 5 when no input from the user is received for a predetermined period of time. The current browsing status is saved to memory 23 before disconnecting, as described above. The connection is automatically reestablished and the most recent browsing status is resumed as soon as the user enters any input which requires access to the network. Hence, the user is not required to initiate a specific log-in procedure in order to resume browsing.

Thus, a method is provided, in a client processing system coupled to a server processing system, of managing communications between the client and the server. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. In a network system including a server system with a plurality of logically connected servers, and a client television system that is connectable to one or more of the servers in the server system, and wherein the client television system is comprised of a conventional television set coupled to an electronic unit which together provide a graphical user interface for permitting a user to use a television set to view content downloaded to the electronic unit from one or more of the servers, a method for permitting notification of the receipt of an electronic message that has been sent to one of the servers of the server system, for delivery to the client television system, comprising:

receiving at one of the servers an electronic message for delivery to the client television system;

if the electronic unit of the client television system is connected to the server system, the server which received the electronic message signaling the client television system in order to provide a perceptible indication at the client television system that electronic mail directed to the user of the client television system is available for viewing;

if the electronic unit of the client television system is not connected to the server system when an electronic message is received at one of the servers for delivery to the client television system, the electronic unit thereafter automatically dialing the server system at a specified time to determine whether the user of the client television system has any new electronic message, and then downloading the electronic message and storing it at the electronic unit, and providing a perceptible indication at the client television system that electronic mail directed to the user of the client television system is available for viewing.

2. The method of claim 1, wherein the perceptible indication is provided by lighting up an LED.

3. The method of claim 1 wherein the perceptible indication is provided by a text message automatically displayed on the television set of the client television system.

4. The method of claim 1 wherein the perceptible indication is provided by a text message displayed on the televisin set of the client television system, and by lighting up an LED.

5. The method of claim 1 wherein automatically dialing the server system at a specified time to determine whether the user of the client television system has any new electronic message comprises automatically dialing out and connecting to one of the servers of the server system at regular intervals.

6. The method of claim 1 wherein automatically dialing the server system at a specified time to determine whether the user of the client television system has any new electronic message comprises automatically dialing out and connecting to one of the servers of the server system at specified times of the day.

\* \* \* \* \*

UNITED STATES PATENT AND TRADEMARK OFFICE
CERTIFICATE OF CORRECTION

PATENT NO. : 6,614,890 B2
DATED : September 2, 2003
INVENTOR(S) : Stephen G. Perlman and Phillip Y. Goldman It is certified that error appears in the above-identified patent and that said Letters Patent is hereby corrected as shown below:

Column 2,
Line 65, after "client then" please delete "established" and insert -- establishes --

Column 6,
Line 29, after "state based" please insert -- on --
Line 53, before "received" please delete "is"

Column 7,
Line 39, after "user can" please delete "selects" and insert -- select --
Line 47, after "client 1" please insert -- can --

Column 10,
Line 10, before "set of the" please delete "televisin" and insert -- television --

Signed and Sealed this

Sixth Day of July, 2004

JON W. DUDAS
*Acting Director of the United States Patent and Trademark Office*